(12) United States Patent
Deibler et al.

(10) Patent No.: US 11,514,144 B1
(45) Date of Patent: Nov. 29, 2022

(54) UNIVERSAL IDENTIFICATION DEVICE

(71) Applicants: Alina Deibler, Phoenix, AZ (US); Victor Adrian Salazar, Laveen, AZ (US)

(72) Inventors: Alina Deibler, Phoenix, AZ (US); Victor Adrian Salazar, Laveen, AZ (US)

( * ) Notice: Subject to any disclaimer, the term of this patent is extended or adjusted under 35 U.S.C. 154(b) by 0 days.

(21) Appl. No.: 16/870,884

(22) Filed: May 8, 2020

Related U.S. Application Data

(60) Provisional application No. 62/845,270, filed on May 8, 2019.

(51) Int. Cl.
| | | |
|---|---|---|
| G06F 21/32 | (2013.01) | |
| G06F 16/28 | (2019.01) | |
| G06F 21/60 | (2013.01) | |
| G06K 7/10 | (2006.01) | |

(52) U.S. Cl.
CPC ............ *G06F 21/32* (2013.01); *G06F 16/284* (2019.01); *G06F 21/602* (2013.01); *G06K 7/10198* (2013.01)

(58) Field of Classification Search
CPC ...... G06F 21/32; G06F 16/284; G06F 21/602; G06K 7/10198
See application file for complete search history.

(56) References Cited

U.S. PATENT DOCUMENTS

| | | |
|---|---|---|
| 5,578,808 A | 11/1996 | Taylor |
| 6,619,553 B1 | 9/2003 | Bobrov et al. |
| 6,950,942 B2 | 9/2005 | Guthery |
| 7,832,649 B2 | 11/2010 | Gardner et al. |
| 8,408,454 B2 | 4/2013 | Hammad |
| 9,904,800 B2 | 2/2018 | Spodak et al. |
| 10,504,104 B2 | 12/2019 | Tanaka |
| 10,521,623 B2 | 12/2019 | Rodriguez et al. |
| 2006/0074713 A1 | 4/2006 | Morrison |
| 2009/0242628 A1 | 10/2009 | Morrison et al. |
| 2011/0108621 A1 | 4/2011 | Grover |
| 2011/0204142 A1 | 8/2011 | Rao |
| 2013/0075469 A1 | 3/2013 | Stochita |
| 2016/0005113 A1* | 1/2016 | Mendez ................. G06Q 40/02 705/35 |
| 2016/0224594 A1* | 8/2016 | Chow ................... G06F 16/211 |
| 2019/0286805 A1* | 9/2019 | Law ....................... G06F 21/34 |
| 2019/0377827 A1* | 12/2019 | Yen ..................... G06F 16/2379 |
| 2021/0182423 A1* | 6/2021 | Padmanabhan ......... G06F 21/64 |

* cited by examiner

*Primary Examiner* — Mohammed Waliullah
(74) *Attorney, Agent, or Firm* — Venjuris PC

(57) ABSTRACT

A Universal identification system comprising: a Universal ID device, a Universal ID reader and a Universal ID computing system is described.

9 Claims, 15 Drawing Sheets

UNIVERSAL IDENTIFICATION DEVICE

This application claim the benefit of U.S. Provisional Patent Application No. 62/845,270 having a filing date of May 8, 2019 which is incorporated by reference in its entirety, including all appendices, as if fully set forth herein.

FIELD

Universal identification ("Universal ID") devices and systems is disclosed. It has applications anywhere identification devices may be necessary; for example, Universal ID consolidates plurality of existing identification cards. Preferably, the Universal ID is a smart device capable of accessing data tied to different IDs issued by governmental institutions in addition to criminal records, health checks, DNA records, Marriage license, Driver License, Birth certificate and Social Security cards by using a reader to access the cloud to get requested information by multiple institutions. As an example, on preferred embodiment of a Universal ID may be a described as a multi identification card.

It is envisioned that Universal ID may provide users a simple way to access to diverse data in an easy and rapid manner without carrying multiple cards and protecting the user from losing important documents.

BACKGROUND

Numerous forms of identification exist such as driver licenses, etc. exist. Yet none of these devices consolidate is a smart device capable of accessing data tied to different IDs issued by governmental institutions in addition to criminal records, health checks, DNA records, Marriage license, Driver License, Birth certificate and Social Security cards by using a reader to access the cloud to get requested information by multiple institutions.

The following background patents (as the following US Patent and Patent Publication Nos.), which are incorporated by reference in their entireties, are disclosed merely for background purposes and relevant to the state of the art, but do not contain one or more of the elements of the present invention:

a. U.S. Pat. No. 5,578,808—issued to Taylor on Nov. 26, 1996,
b. U.S. Pat. No. 6,619,553—issued to Bobrov et al. on Sep. 16, 2003,
c. U.S. Pat. No. 6,950,942—issued to Guthery on Sep. 27, 2004,
d. 20060074713— published for Morrison on Apr. 6, 2006,
e. 20090242628—published for Conry et al. on Oct. 1, 2009,
f. U.S. Pat. No. 7,832,649—issued to Gardner et al. on Nov. 16, 2010,
g. 20110108621—published for Grover on Apr. 12, 2011,
h. 20110204142—published for Rao on Aug. 25, 2011,
i. 20130075469—published for Stochita on Mar. 28, 2013,
j. U.S. Pat. No. 8,408,454—issued to Hammad on Apr. 2, 2013,
k. 20130075469—published for Krawczewicz et al. on Sep. 5, 2013,
l. U.S. Pat. No. 9,904,800—issued to Spodak et al. on Feb. 27, 2018,
m. U.S. Pat. No. 10,504,104—issued to Tanaka on Dec. 10, 2019, and Ser.
n. U.S. Pat. No. 10,521,623—issued to Rodriguez et al. on Dec. 31, 2019.

SUMMARY

The structure, overall operation and technical characteristics of the present invention will become apparent with the detailed description of preferred embodiments and the illustration of the related drawings herein.

Preferably, the invention consists of Universal ID using a methodology for communication within an Universal ID system using an Universal ID reader. Preferably, this Universal ID reader will read all the information needed from a Universal ID device such as a smart chip in a Universal ID card. After gathering all the information needed, the Universal ID reader will perform an API [application programming interface] request passing encrypted information and all the mandatory authentication headers. The Universal ID computing system will accept the request and validate all the data to ensure it is received from a trusted source. In a preferred embodiment, dual authentication such as a smart phone or some other devices may be used to provide enhanced security.

One preferred embodiment of a Universal identification system for combining a plurality of identifications the system includes a Universal ID device including encrypted identification data storage and authentication access, a Universal ID reader having internet connection and able read the Universal ID device and an output to display data and a Universal ID computing system connected to the Universal ID reader and including at least one relational database ensuring uncorrupted data and at least one non-relational database for storage of information. More preferably, the Universal ID device is a smart card including a smart chip. More preferably, the smart chip stores information about one or more of the following: a natural person, a juridical person, an animal, a plant and a thing. Additionally preferable, the Universal ID reader reads the information from the smart chip and using the internet requests information from a Universal ID services. In another preferred embodiment, the Universal ID reader further comprises an additional verification input unique to at least one of following associated with the Universal ID device: the natural person, the juridical person, the animal, the plant and the thing.

The Universal ID computing system may also preferably include computing services residing in a cloud. More preferably, the Universal ID computing system further including microservices wherein each set of information represents a logical block of data. Also more preferably, the Universal ID computing system further including at least one microservice wherein the microservice each set of information processed represents a logical block of data. Most preferably, the microservices include elements selected from the group consisting of an application programming interface, a background offline data processing, a cache unit, and a database.

In another preferred embodiment, a Universal identification system method for combining a plurality of identifications the system is described having the steps of: Coupling a Universal ID device to an Universal ID reader, Gathering data from the Universal ID device by Universal ID reader, Creating an application programming interface by the Universal ID reader, Requesting additional verification input by the Universal ID reader, Sending at least one request from the Universal ID reader to a Universal ID computing system, Validating the at least one request by the Universal ID computing system, Gathering responsive data by the Universal ID computing system, Sending responsive data from the Universal ID computing system to the Universal ID reader, Validating responsive data by the Universal ID reader, and Displaying responsive data on a screen of the Universal ID reader. More preferably, the step of requesting additional verification input by the Universal ID reader includes requesting at least one of the following: fingerprints, photos, retinal scan or DNA associated with the Universal ID device. Also more preferably, the step of requesting additional verification input by the Universal ID reader includes requesting at least one of the following: fingerprints, photos, retinal scan or DNA which are matched against information stored on the Universal ID device.

Preferably, the the step of Sending a request from the Universal ID reader to a Universal ID computing system includes encrypting the request. Also preferably, the step of Validating request by the Universal ID computing system includes decrypting the request. Additionally preferably, the step of Gathering responsive data by the Universal ID computing system includes accessing at least one non-relational database.

Likewise preferably, the step of Gathering responsive data by the Universal ID computing system includes building responsive data from the at least one non-relational database. More preferably yet, the step of Sending responsive data from the Universal ID computing system to the Universal ID reader includes encrypting the responsive data. Most preferably, the method comprises the further step of storing the responsive data on the Universal ID device.

DETAILED DESCRIPTION

A preferred embodiment of the invention comprises the following components: 1) Database (DB) and computing services existing in the cloud to be able to scale up as demand dictates. DB will primarily use relational database to ensure the uncorrupted data, and non-relational database (s) for extensive storage of information; 2) A Universal ID device, such as a smart card, will preferably have a chip to store identification data using encryption to assure genuity of the document and/or data and authenticate access to the cloud to request specified data by using an Universal ID reader; and 3) The Universal ID reader will require internet connection to connect to the cloud using encrypted data to request all the information needed by the user at the time.

Figure 1:
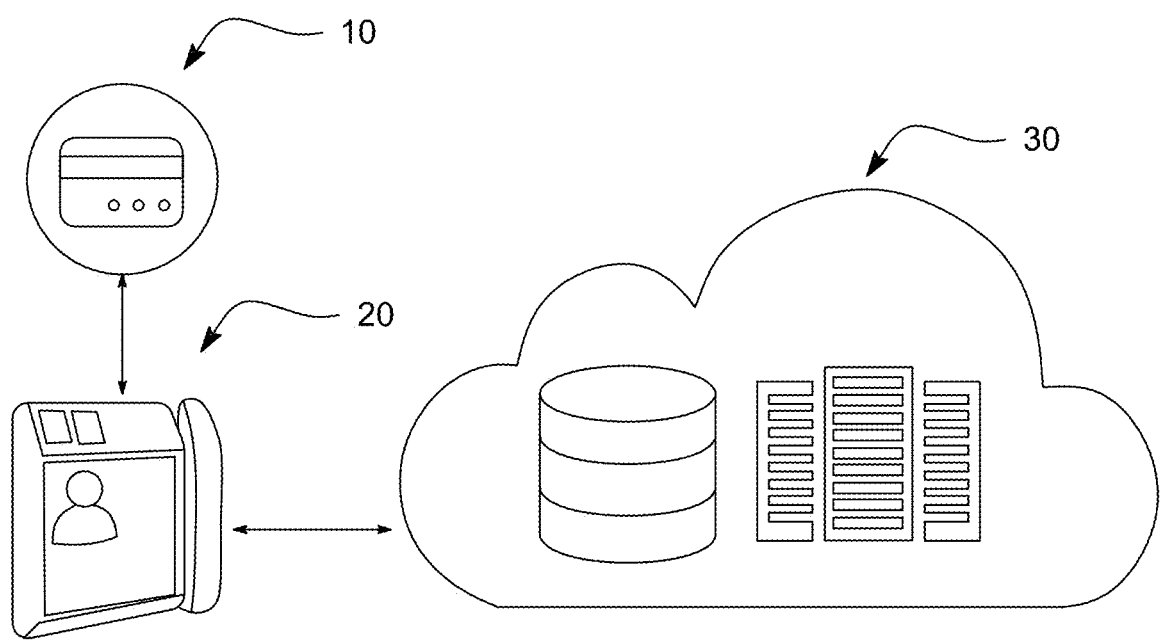
FIG. 1 shows a pictorial diagram of one preferred embodiment of components.

In a preferred embodiment of the invention comprises the following methodology: communication within the Universal ID system using a Universal ID Reader. In this preferred embodiment, the Universal ID Reader will read all the information needed from the smart chip in the card. After gathering all the information needed, the Universal ID Reader will create an API request passing encrypted information and all the mandatory authentication headers. In a preferred embodiment, the Universal ID system will accept the request and validate all the data to ensure it is coming from a trusted source. FIG. 1 shows schematically a preferred embodiment where a Universal ID device 10, preferably a smart card with embedded chip or some other device with stored information, a Universal ID reader 20, and Universal ID computing system 30 communicate after validation.

Figure 2:
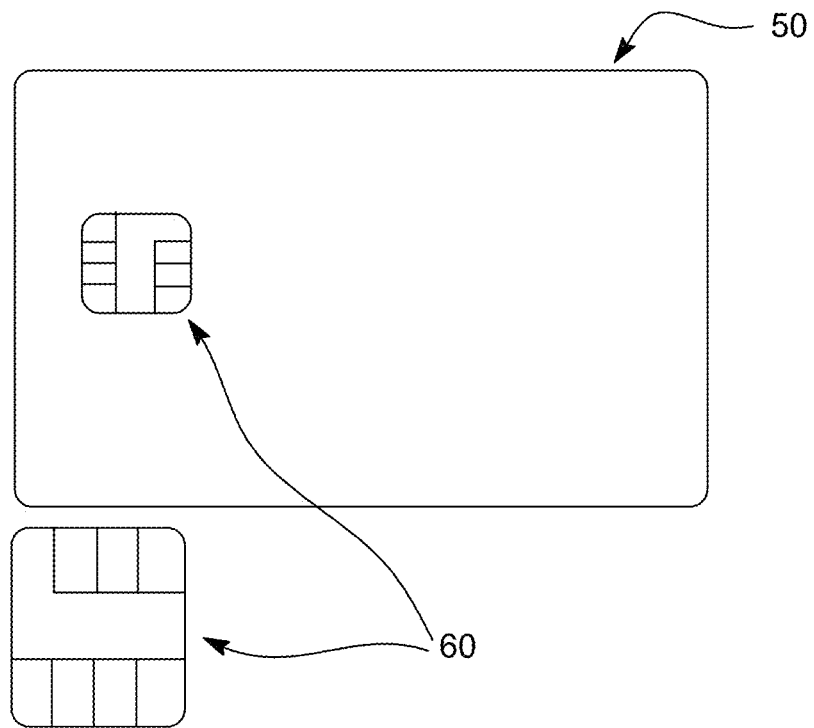
FIG. 2 shows a pictorial diagram of one preferred embodiment of a Universal ID device, namely a Universal ID card with smart chip.

In a preferred embodiment, the invention includes a Universal ID device. Preferably, this device can be any device that can store pertinent information about user such as a natural person, a juridical person, an animal, a plant or a thing such that information can be used with the invention and authenticated. More preferably and as shown in FIG. 2, the Universal ID device is smart card 50 containing a smart chip 60, and most preferably, the smart card will have an embedded chip following the IEC 7810 international standard. The size for this smart chip will be ID-3 (125×88 mm) in a B7 format.

Figure 3:
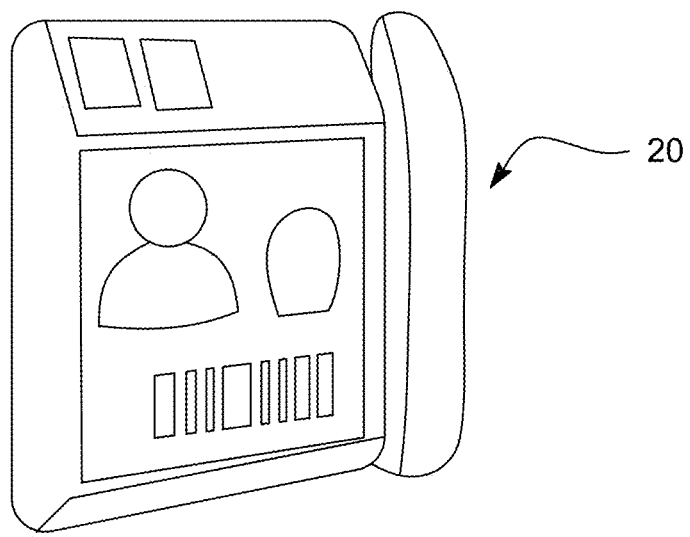
FIG. 3 shows a pictorial diagram of one preferred embodiment of a Universal ID reader.

In a preferred embodiment, the invention includes a Universal ID reader 20 as shown in FIG. 3. Preferably, the Universal ID reader is a smart chip reader with internet connection capable of reading the information from the smart card and sending that information to the cloud and requesting information from Universal ID services. In addition, it will have a screen to show data coming back from the cloud such as photography, personal data and a verification status result. In a preferred embodiment, verification requires a second step that is unique to the user of the Universal ID device, such as fingerprints, facial recognition, retinal identification, DNA, randomly authenticated key pair or some other unique feature of associated with the user when using the Universal ID reader. It is believed that this way we can protect users from identity theft and adds better security.

In a preferred embodiment, the invention includes a Universal ID computing system; preferably the Universal ID computing system includes computing services residing in the cloud to ensure scalability as demand dictates. Preferably, this computing service will be formed by a relational database to ensure structured data and non-relational databases for bulk data storing.

In a preferred embodiment, the invention Universal ID computing system further includes microservices, and more preferably the microservices will be of an approach where every single set of information will represent a logical block of data. Most preferably, each block of data will be handled by an individual microservice. In a preferred implementation of microservices is that the user interface (Universal ID device and Universal ID reader (preferably smart care and card readers) utilize User Interface software (UI) to manage data, and any other part where the user can interact with the system) will communicate thru APIs. Each API will be independent and responsible to handle all the business logic attached to that specific API. Preferably, the UI will not communicate to the database directly. In the preferred embodiment, communication with and access to each database will be mandatory via each API; however, every single API is capable to communicating with other APIs to get certain additional set(s) of data depending on what the business requirements are.

Figure 4:
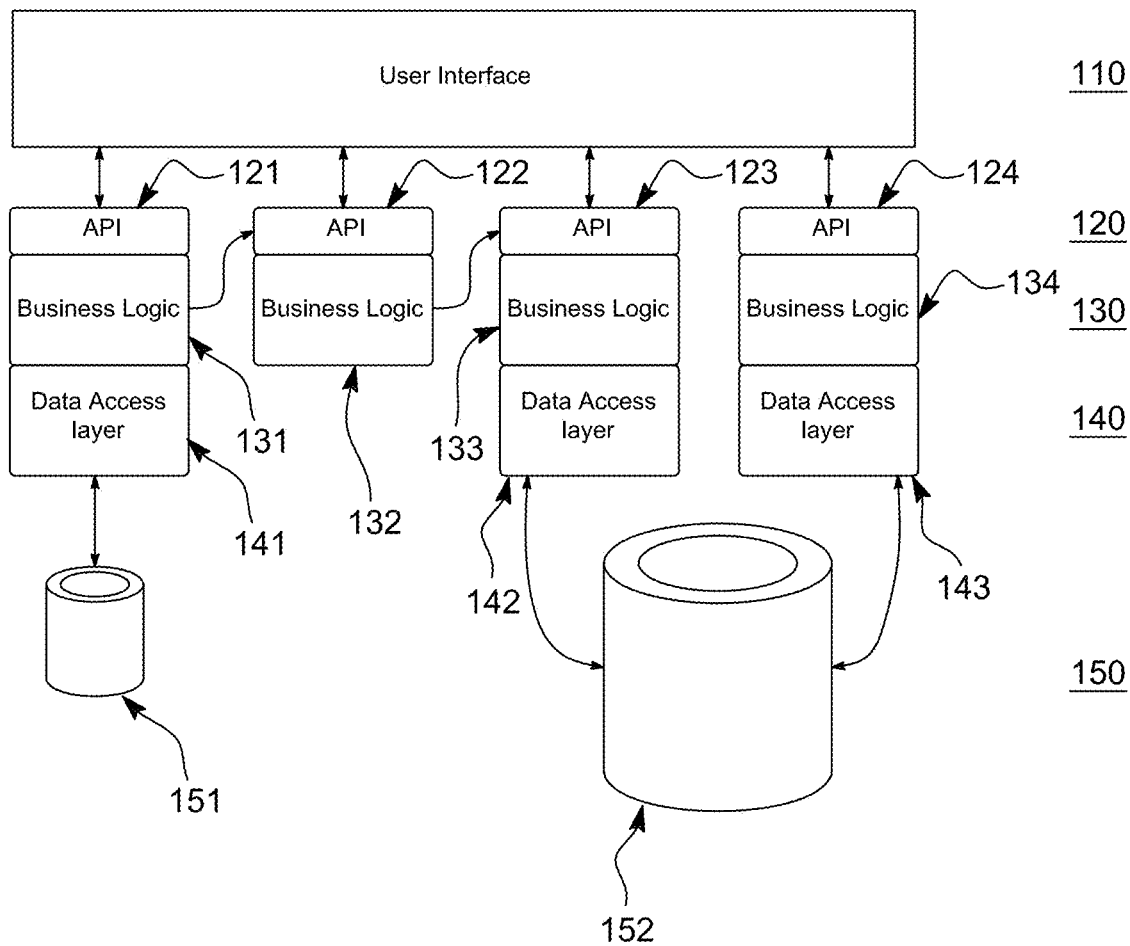
FIG. 4 shows a block diagram of one preferred embodiment of microservices architecture.

FIG. 4 shows a preferred embodiment of implementation of the microservices including Universal ID reader (user interface) 110, API 120 generally (denoted by specific 121, 122, 123, and 124, specifically), Business logic 130 (denoted by specific 131, 132, 133, and 134, specifically, data access layer 140 (denoted by specific 141, 142, and 143, specifically and SQL (structure query language or "sequel") managed database 150 (denoted by specific 151 and 153, specifically.

Figure 5:
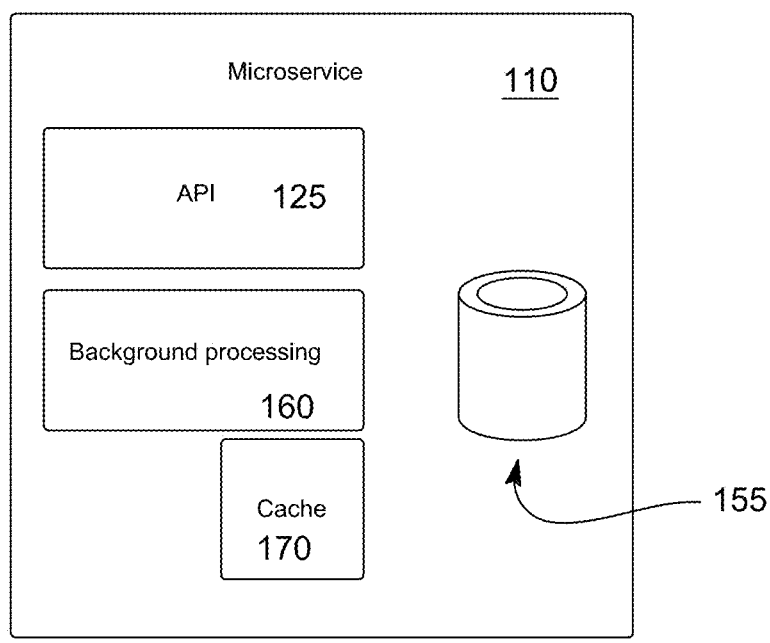
FIG. 5 shows a pictorial diagram of one preferred embodiment showing one possible microservice.

In a preferred embodiment, every single Microservice can have the following elements:
  API
  Background offline data processing
  Cache unit
  Database In a preferred embodiment, each API is a gateway to access specific information needed by the user. Preferably, the invention includes background offline data processing that refers to an automated web job that can be processing batches of data in a separate task in order to enhance performance. More preferably, one or more cache units will be implemented to handle large sets of data to which constant access is needed and wherein such data rarely changes, if at all. In a most preferred embodiment, each database might be shared with some other services or might be individual depending on the business needs. FIG. 5 shows a preferred embodiment of a microservice 110 having an API 125, background processing 160, cache 170 and SQL database 155.

Figure 6:
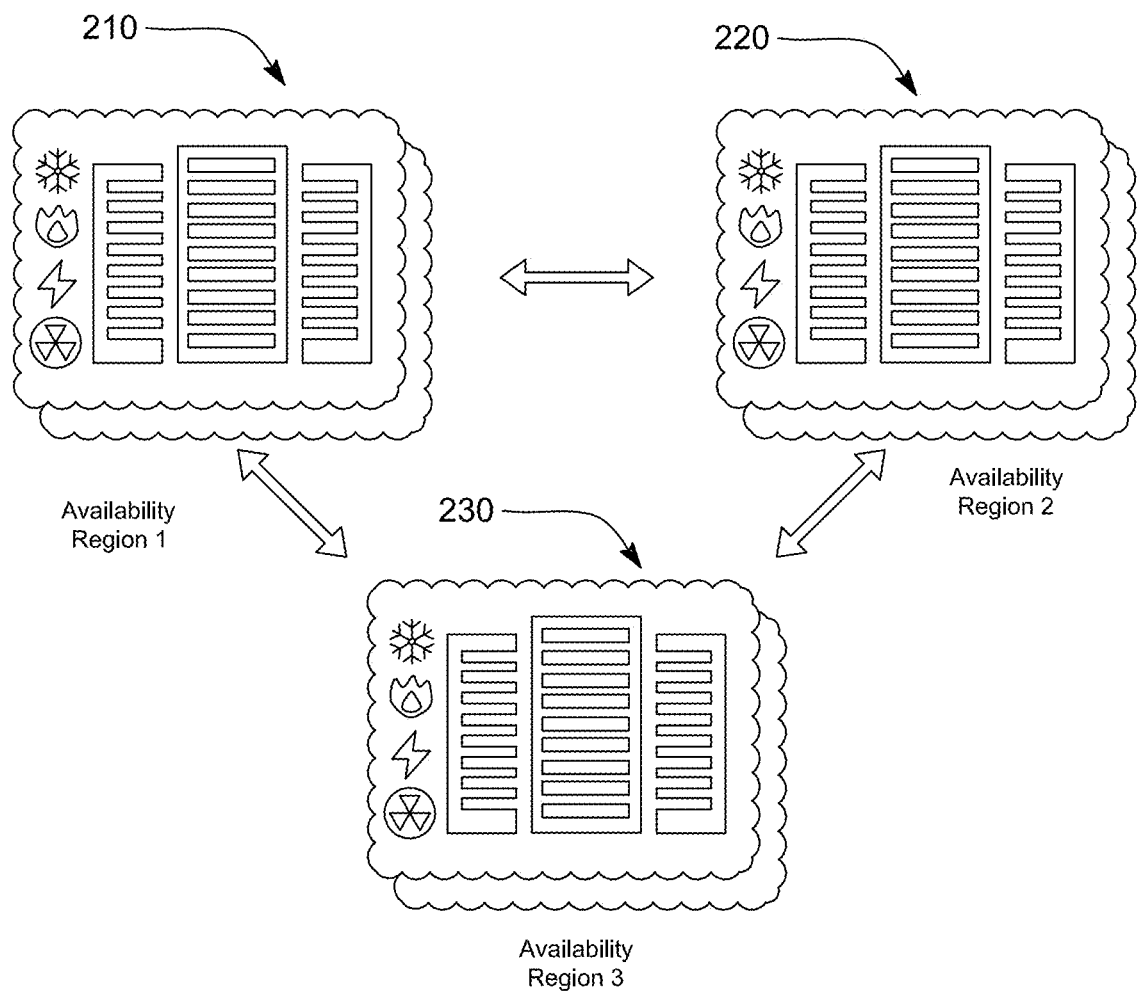
FIG. 6 shows a pictorial diagram of one preferred embodiment of a platform for use with the computing system.

In a preferred embodiment, the invention uses a platform for the relational database(s). More preferably, the platform is cloud-based including at least two regions which assures availability of 99.9% and implement continuous backups; for example, as shown in FIG. 6 (showing three regions 210, 220 and 230). In a more preferred embodiment, the platform will start with 2 different locations (West and East) using load balancing components to deliver the traffic to the nearest servers.

Figure 7:
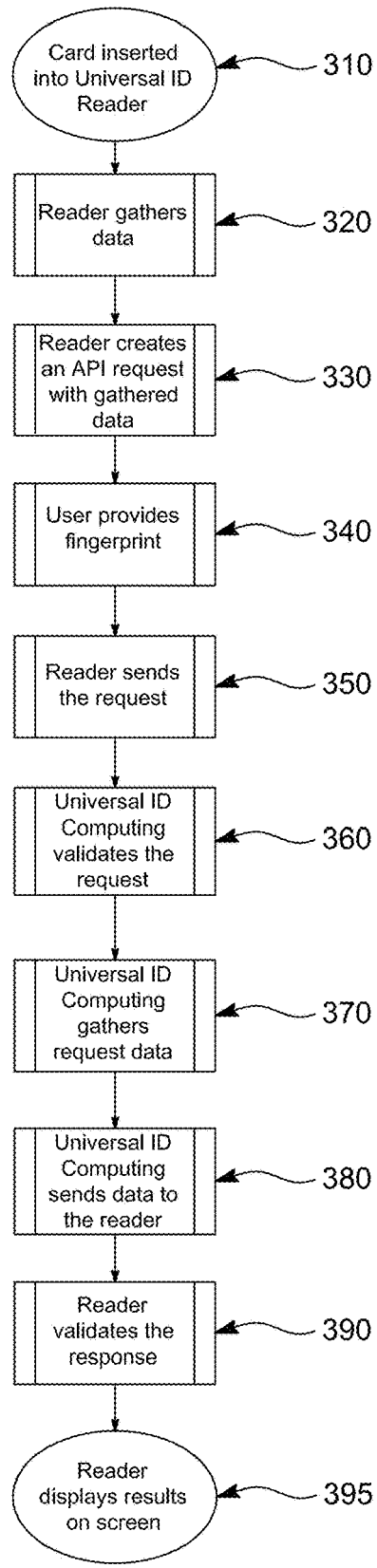
FIG. 7 shows a block diagram of one preferred embodiment of a methodology for use with Universal ID device which is a card in this embodiment.

In a preferred embodiment, the invention uses a methodology to get data from Universal ID device; for example, when a smart card is inserted into the Universal ID reader; for example 310 in FIG. 7. Preferably, the Universal ID reader will gather from the smart chip such as the fingerprints, photos and user data, etc.; for example 320 in FIG. 7. Most preferably, after the data has been collected by the Universal ID reader, the Universal ID reader 330 will prompt the user to provide fingerprints 340 to ensure the Universal ID isn't being used by some other individual as shown in FIG. 7.

In the preferred embodiment shown in FIG. 7, the reader will append the fingerprints data to a Universal ID request 350 and that is sent to the cloud using encrypted data. Preferably, the Universal ID computing system will get the request and will decrypt the data to compare the DB against the request and whether allow or refuse communication 360. If the request is successfully validated, then all the requested data will be collected from the DB and creates a response 370.

In this preferred embodiment, the response will be encrypted and sent to the Universal ID reader 380. The Universal ID reader will decrypt and validate the response 390 and will display the results in the screen to show the requested data 395.

Figure 8:
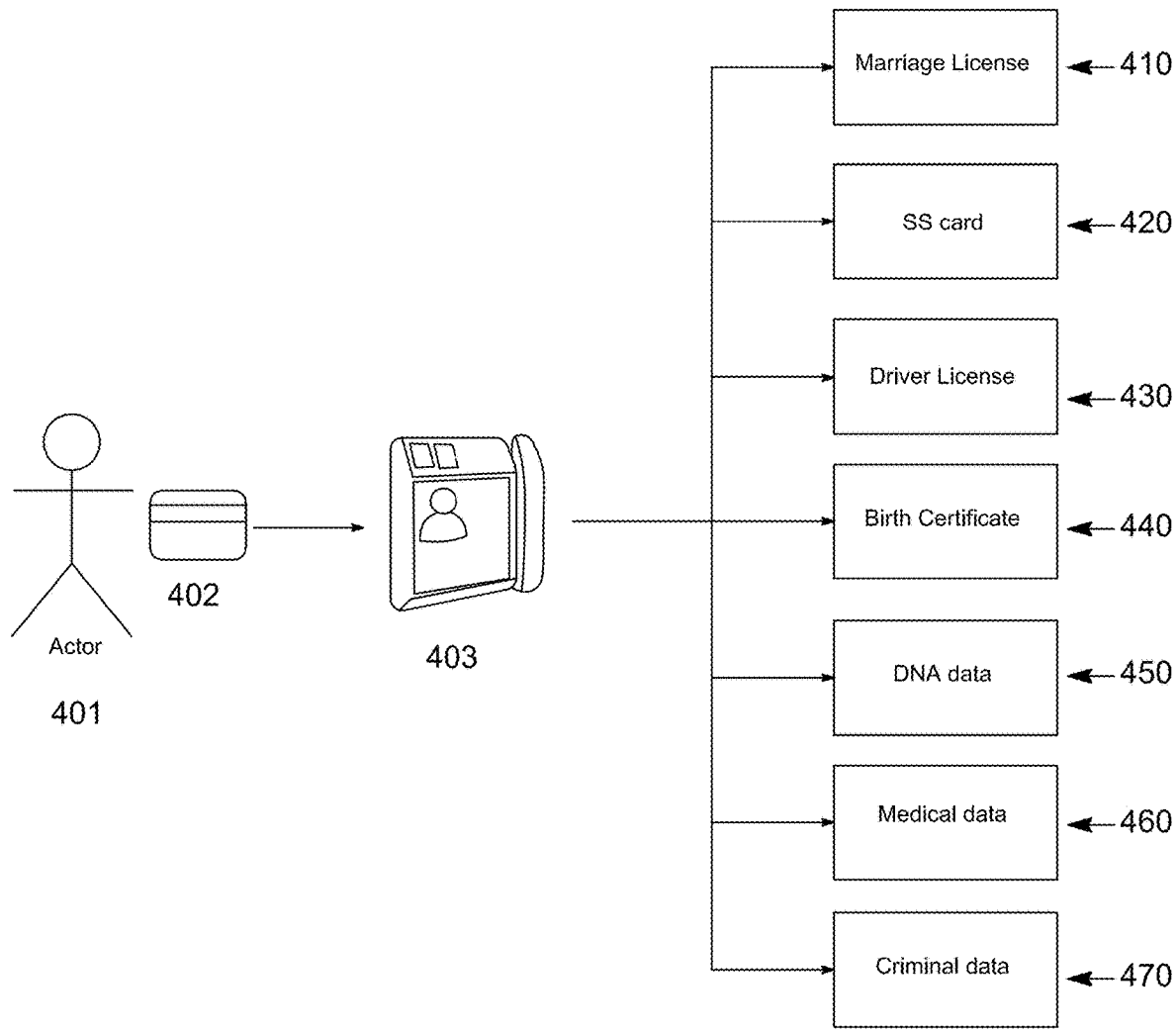
FIG. 8 shows a pictorial diagram of one preferred embodiment of a possible output from a Universal ID reader.

In a preferred embodiment, the invention a Universal ID system 400 will store and provide data for different categories listed above but not limited to them. Each Universal ID Reader will be specially configured to allow requests to access to certain sets of data depending on the business needs. FIG. 8 shows a preferred embodiment including a user (actor) 401, a Universal ID device (smart card) 402, Universal reader 403, and various sets of data pertinent to the user such as marriage license 410, social security card 420, driver's license 430, birth certificate 440, DNA data 450, medical data 460, and criminal data 470. In more preferred embodiments, other sets of data pertinent to the user may be added, such as licenses, university degrees, or other achievements or disciplinary actions.

Figure 9:
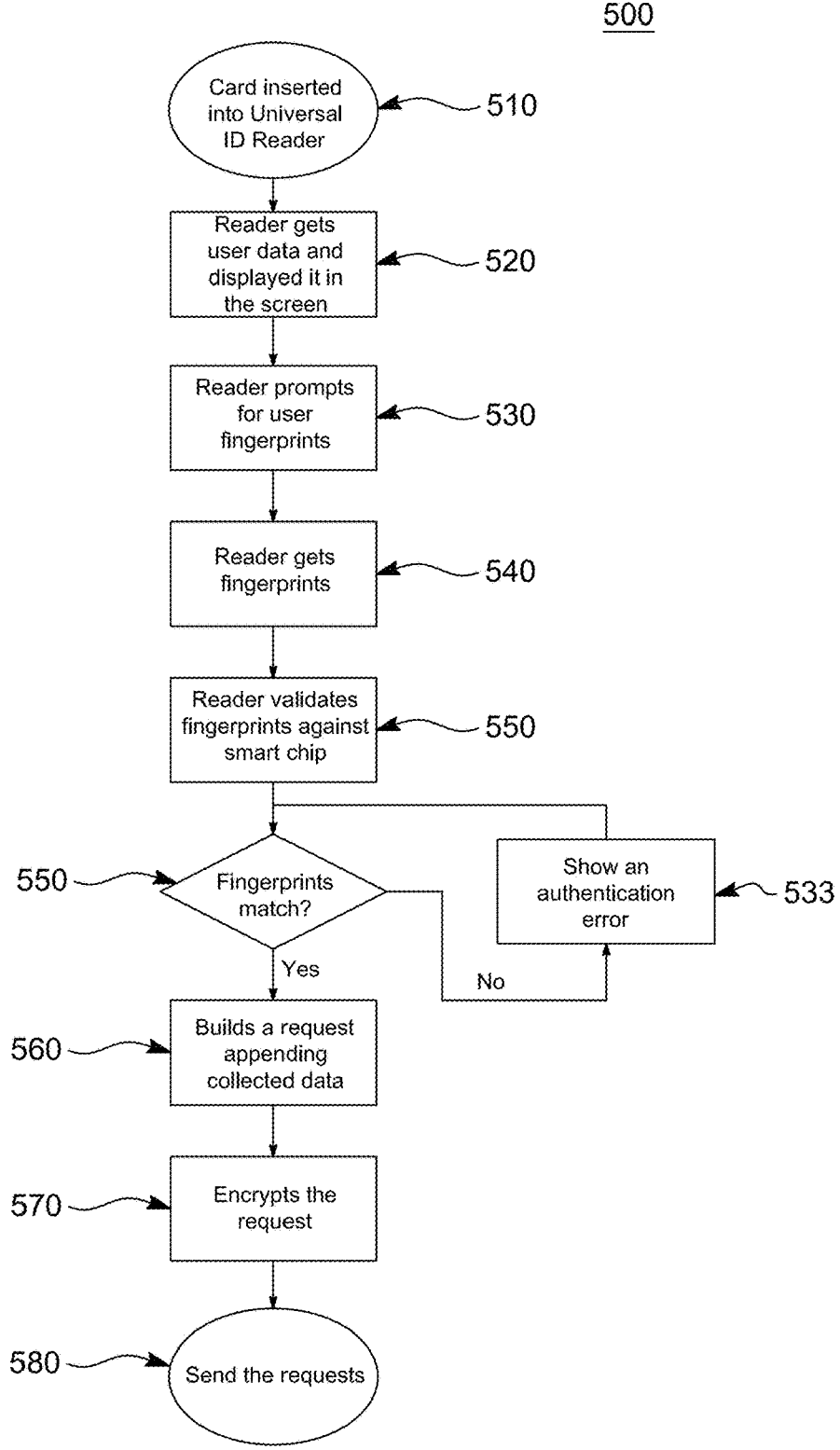
FIG. 9 shows a block diagram of one preferred embodiment of a methodology for use with Universal ID device, which is a card in this embodiment, using a fingerprint authentication.

In a preferred embodiment, the invention includes a Universal ID reader 500 that initiates a request. In this preferred embodiment, when the Universal ID Reader performs a smart chip read 510, the Universal ID reader may access some or all the user data stored. Preferably, the Universal ID Reader may collect, among other things, photos, fingerprints and user data such as Birthdate, Full name and Address. In this preferred embodiment, the Universal ID reader preferably displays some or all of the collected data on the screen 520, and then may prompt the user for other identifying information for verification 530, such as fingerprints, preferably by scanner 540, as a last step before sending a request. This preferred verification will allow the user to have at least 2 security checks, first visually comparing the photo with the individual, and second check would be matching fingerprints, or whatever other identifying information, with what is stored in the smart chip. Preferably, this will ensure the Universal ID system is being used by the person tied to the Universal ID device. In this preferred embodiment shown in FIG. 9 validates the fingerprints 550, if the fingerprints do not match, then an authentication error 553 will be displayed in the screen asking the personal to take an action, whether to refuse the requested service or to try again. In this preferred embodiment, it is not possible to request any information if the fingerprints do not match with the data stored in the smart chip.

In this preferred embodiment, if the fingerprints match, then the reader will collect all the data provided and start encrypting all the information using an internal encryption method to ensure communication is E2E (end to end) and cannot be decrypted in between endpoints. In this preferred embodiment, this request will include authentication headers since those are mandatory by Universal ID computing to authenticate communication. In this preferred embodiment, after all the information is collected, Universal ID Reader builds a request appending collected data 560, encrypts the request 570 and sends the request 580 and waits for the response.

In a preferred embodiment, the invention includes a Universal ID reader 610 that gets the response and decrypts the data 620 using an internal decryption method to authenticate the response 640.

Figure 10:
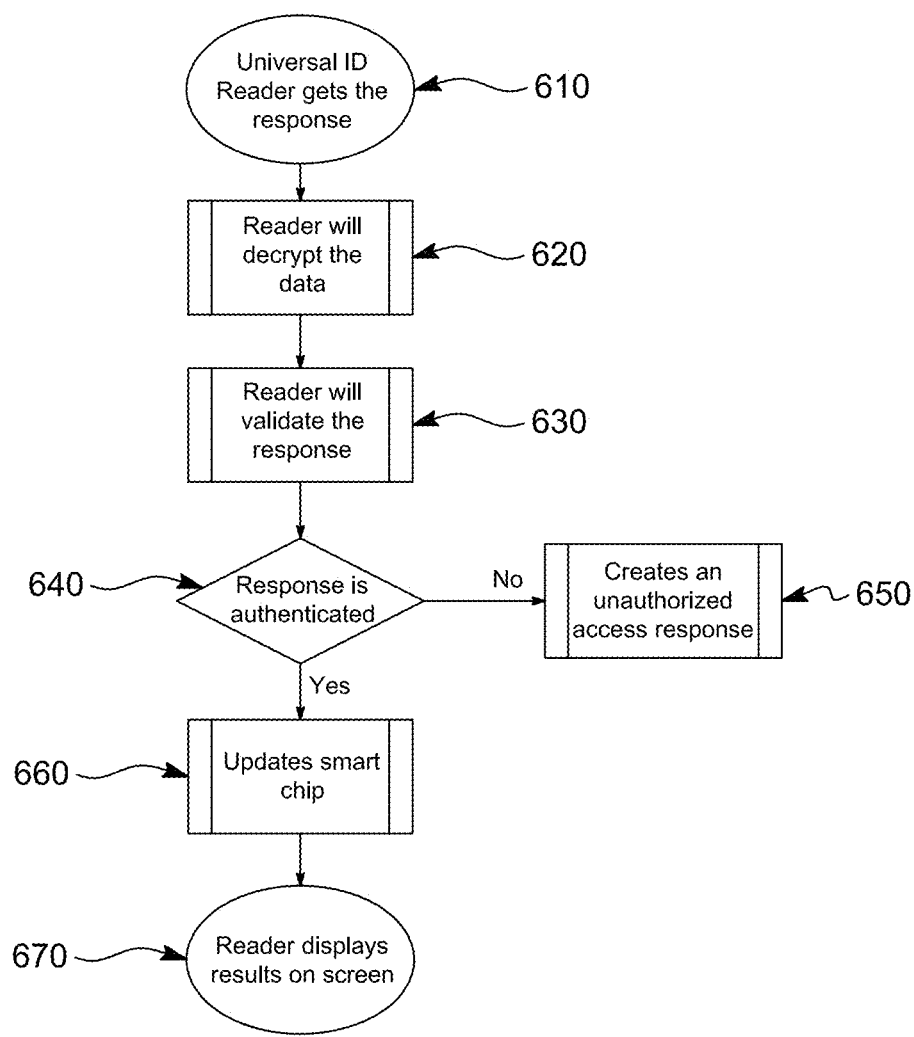
FIG. 10 shows a block diagram of one preferred embodiment of a response methodology for use with Universal ID Reader.

In this preferred embodiment, if a valid response is obtained after performing all the internal validation checks 630, the Universal ID reader will perform CRUD (Create, Read, Update, Delete) operations over the smart chip 660 and will display the results in the screen 670. In this preferred embodiment, if the response does not pass all the validation checks it assumes the data is corrupted and will show an authentication error 650. FIG. 10 shows one preferred embodiment the response process.

In a preferred embodiment, the invention includes Universal ID computing 700 such that it uses microservices methodology to build reliable services, Universal ID computing may include one or more APIs dedicated to identify and respond to incoming requests 710 from multiple Universal ID Readers from different locations. In a preferred embodiment, each request will come from a Universal ID reader identifier with a set of values and be decrypted 720 that will authenticate the request from a specific device. In a preferred embodiment, it is the intention to prevent non authorized requests from obtaining or stealing information of different individuals in the Universal ID database(s).

Figure 11:
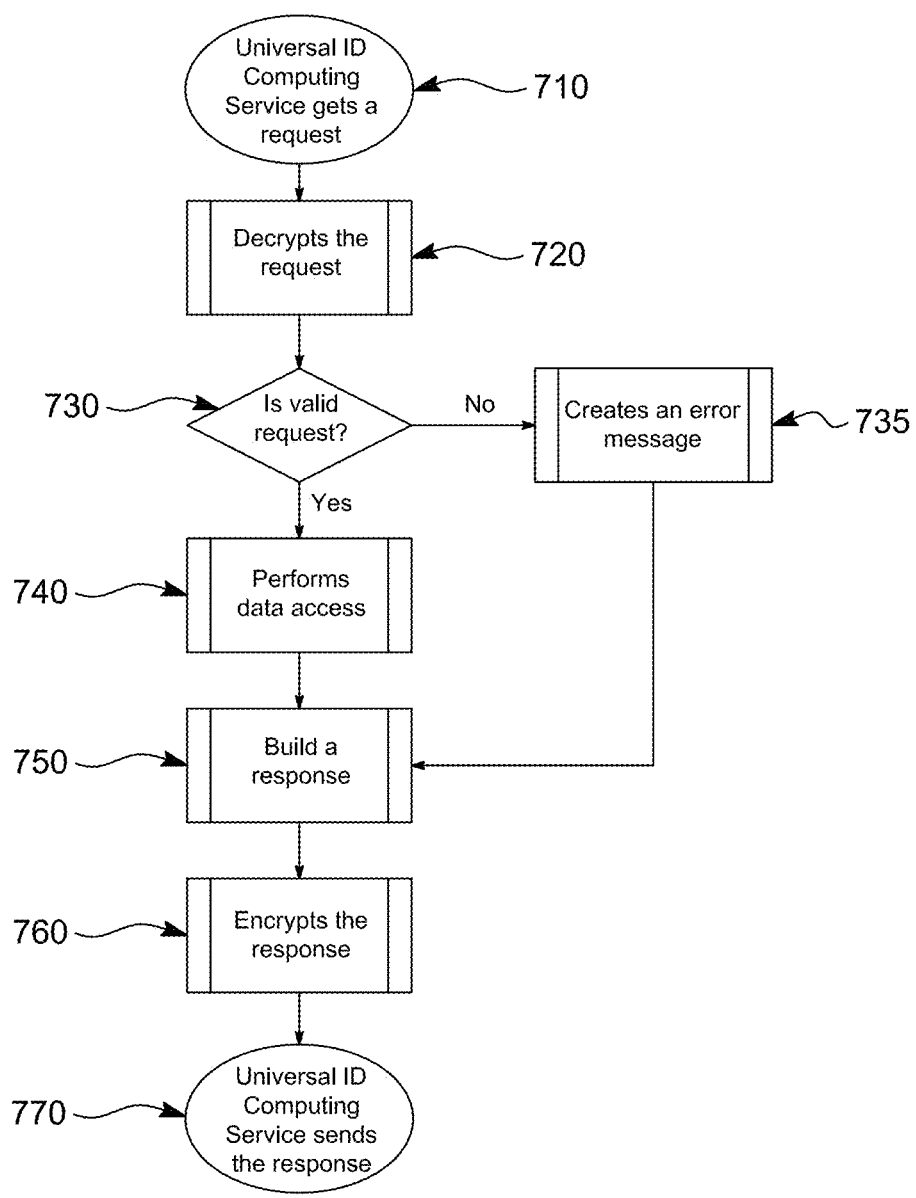
FIG. 11 shows a block diagram of one preferred embodiment of a request methodology for use with Universal ID computing service.

In a preferred embodiment, if a request is authenticated 730, then Universal ID computing services will perform a data source access 740 (it can be databases or external services) to gather all the information requested and then a response will be built 750 with an authenticated token, encrypted 760, and sent 770 so the Universal ID reader can verify the response is coming from Universal ID Computing services rather than some fake service in case the Universal ID Reader was hacked to point to a different location for requests. FIG. 11 shows a preferred embodiment of different scenarios where the Universal ID Computing service may proceed. If the request is not validated, then the Universal ID Computing service an error message is created 735, a response is built 750, then encrypted 760 and sent 770 to the Universal ID reader.

Figure 12:
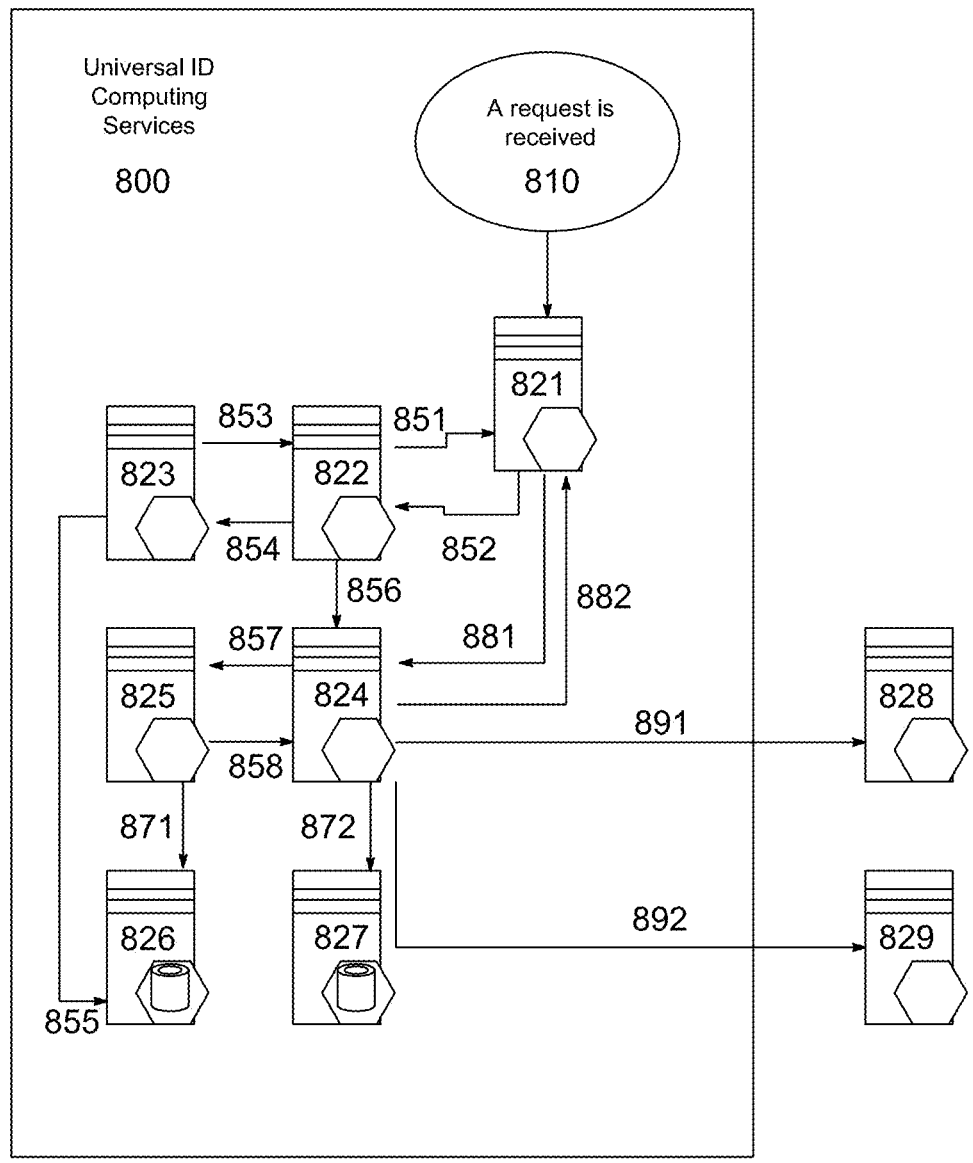
FIG. 12 shows a pictorial diagram of one preferred embodiment of how the communication works within services.

In a preferred embodiment, the invention includes data access; for example, a cluster of different services may be used to fetch and retrieve data from Universal ID computing services 800, after request validation a set of internal and external requests will be performed to different services to resolve the request 810. In a preferred embodiment, each microservice (denoted 821, 822, 823, 824, 825, 826, and 827) will have dual communication with multiple endpoints (denoted 851, 852, 853, 854, 855, 856, 857, 858, 871, 872, 881, and 882) residing in different services. External services, whether private or public, such as governmental databases, medical databases, criminal databases, etc., are shown as 828 and 829 and are connected by 891, and 892, usually bidirectionally, and could technically be thought of as microservices albeit external. In a preferred embodiment, some services will be dedicated to store databases and some other services may be dedicated to performing business logic. In a preferred embodiment, in addition to the local services, external services may be required to feed the Universal ID database. FIG. 12 shows one preferred embodiment of the Universal ID computing services.

Figure 13:
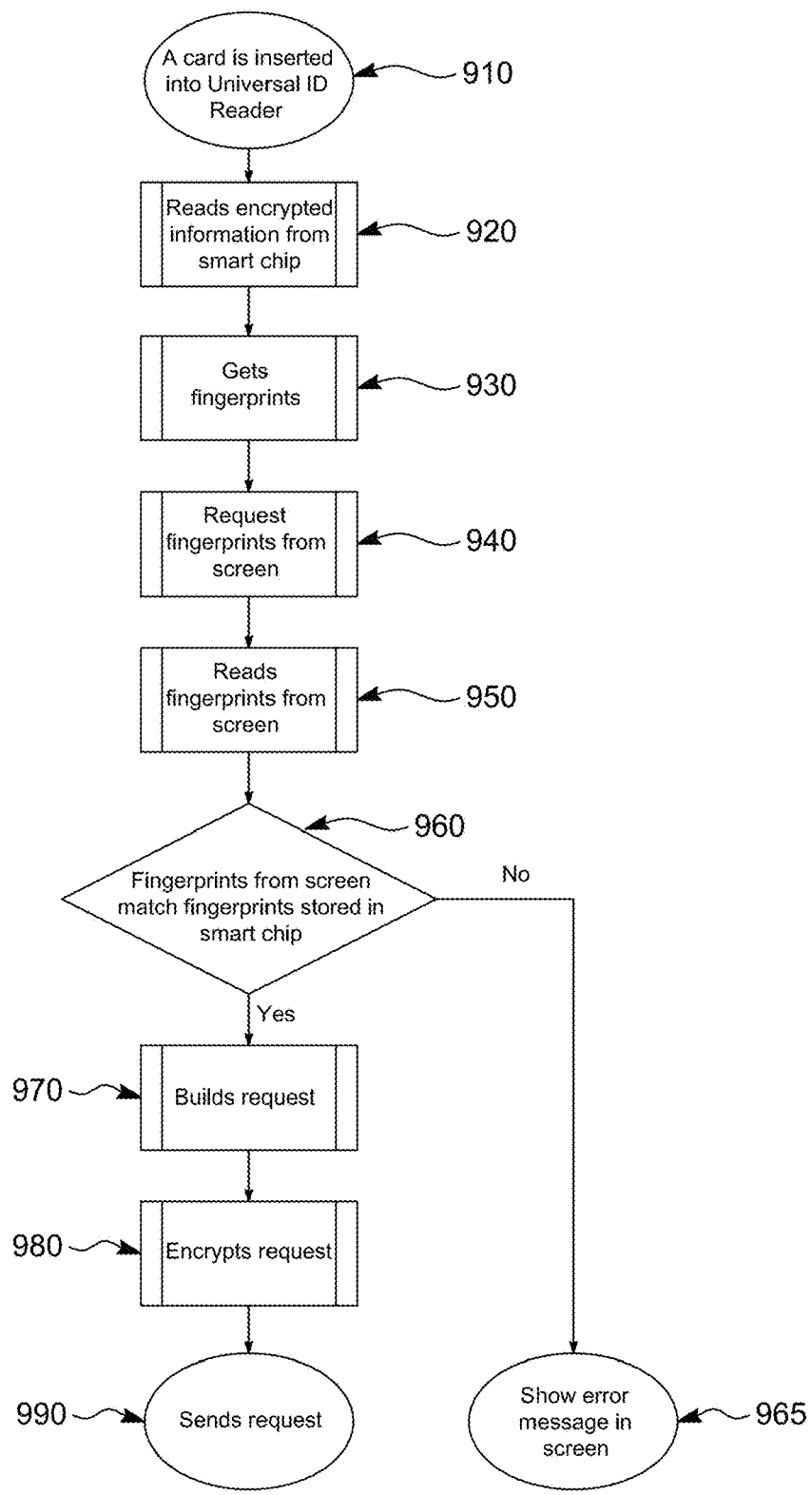
FIG. 13 shows a block diagram of one preferred embodiment of a methodology for use with Universal ID computing service using a fingerprint authentication.

In a preferred embodiment, the invention includes authentication using the Universal ID reader and Universal ID card. Preferably, the Universal ID reader will perform authentications over the card inserted (Universal ID device) in addition to the responses coming from Universal ID Computing services. In this preferred embodiment, both authentications are needed in order to provide cyber security to the system and avoid hackers to steal data from Universal ID. For example, preferably, if a Universal ID devices (e.g. smart card) is stolen and being used by a different individual, it should be detectable to identify an unauthorized use of the smart card. More preferably, the same identification happens if the Universal ID card is cloned and a different person is trying to get access to all the data from the card. In this preferred embodiment, authentication over the stored data in the smart chip is required. FIG. 13 shows the overall of the validation over the Universal ID card where the Universal ID devices is inserted into a Universal ID reader 910, the Universal ID reader reads encrypted data from a smart chip 920, the Universal ID reader gets stored fingerprints 930, the Universal ID reader request fingerprints from its screen 940, the Universal ID reader reads or scans fingerprints 950, the fingerprints of 930 and 950 are verified 960, if verification fails, the Universal ID reader shows an error on the screen 965, if verification is authenticated, the Universal ID reader builds a request 970, encrypts the request 980 and sends the request 990.

In a preferred embodiment, the invention includes authentication having a Universal ID computing response 1000 (FIG. 14) where the Universal ID Reader may authenticate the response coming from Universal ID computing services. In this preferred embodiment, this authentication will prevent hacking from Universal ID Reader (for example, it can prevent a hack of an Universal ID Reader to change Universal ID Computing services domain for some untrusty endpoints created by a third party provider or hacker to fake a response and get access from Universal ID computing system).

Figure 14:
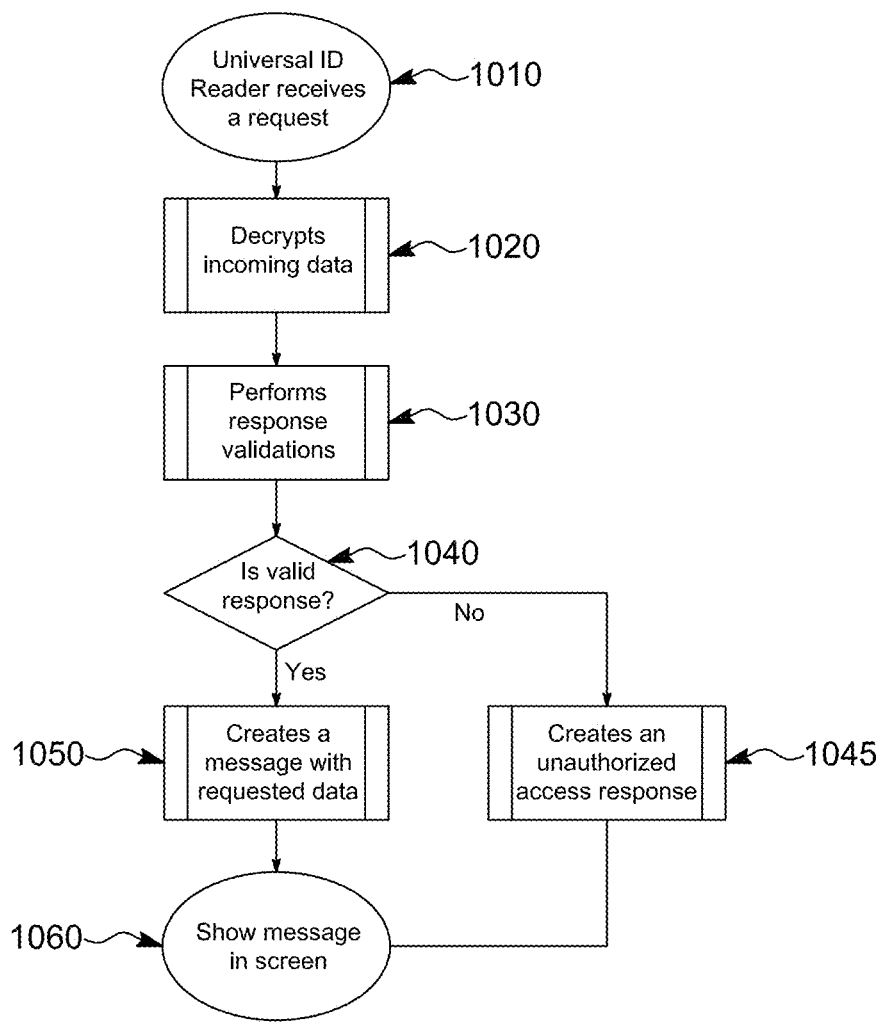
FIG. 14 shows a block diagram of one preferred embodiment of a response methodology for use with Universal ID Reader.

In a preferred embodiment, validations are to be performed using an internal decryption method residing in the Universal ID Reader's software. If all the validations pass, then the requested information will be shown in the Universal ID Reader's screen, otherwise an error message will be shown instead to advise the Universal ID Reader operator to take the corresponding action (for example, denying access to some services). FIG. 14 shows one preferred embodiment of the Universal ID Computing services response validation where the Universal ID reader receives a response 1010, decrypts the response 1020, performs validations of the response 1030 and questions if the response is valid 1040, if not an unauthorized access message is created 1045 which is shown on the Universal ID reader screen 1060, but if valid creates a message with requested data 1050 which is shown on the Universal ID reader 1060.

Figure 15:
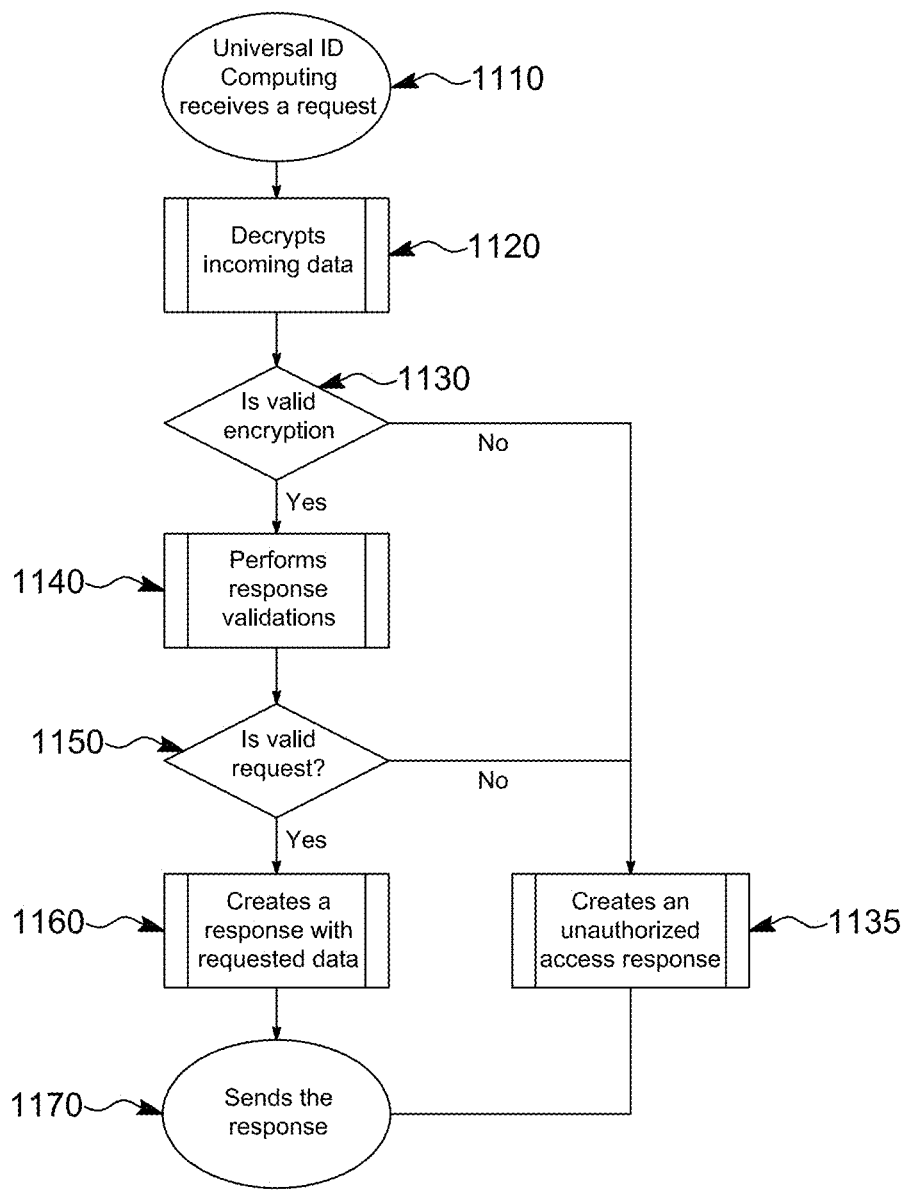
FIG. 15 shows a block diagram of one preferred embodiment of a methodology for use with Universal ID computing.

In a preferred embodiment, the invention includes authentication using Universal ID computing where request authentication is used to prevent hacking and information from being stolen by hackers or non-authorized access (for example, if somebody creates a request to Universal ID Computing endpoints, Universal ID Computing must be able to deny access. In a preferred embodiment, two step authentications will be performed in the following order: 1) Verify the encrypted request follows the Universal ID encryption rules and 2) Authentication headers are included in the request. In a preferred embodiment, if any of the previous validations fails, then Universal ID Computing services will send a response indicating a non-authorized access was attempted. FIG. 15 shows one preferred embodiment of authentication using Universal ID computing where the Universal ID computing receives a request 1110, decrypts the incoming data 1120, check if the encryption is valid 1130, if not creates an unauthorized access response 1135, if encryption is valid performs a response validation 1140, if the response is invalid creates an unauthorized access response 1135, if the response is valid creates response with requested data 1160, and ultimately sends either the unauthorized access response 1135 or the response with requested data 1170.

What is claimed:

1. A Universal identification system for combining a plurality of identifications the system comprising:
    a Universal ID device including encrypted identification data storage and authentication access,
    a Universal ID reader having internet connection and able read the Universal ID device and an output to display data and
    a Universal ID computing system connected to the Universal ID reader and including at least one relational database ensuring uncorrupted data and at least one non-relational database for storage of information and wherein the Universal ID device is a smart card including a smart chip and wherein the smart chip stores information about one or more of the following: a natural person, a juridical person, an animal, a plant and a thing and wherein the Universal ID reader reads the information from the smart chip and using the internet requests information from a Universal ID services and wherein the Universal ID reader further comprises an additional verification input unique to at least one of following associated with the Universal ID device: the natural person, the juridical person, the animal, the plant and the thing and wherein the Universal ID computing system includes computing services residing in a cloud wherein the Universal ID computing system further including microservices wherein each set of information represents a logical block of data and further including at least one microservice wherein the microservice each set of information processed represents a logical block of data and wherein the microservices include elements selected from the group consisting of an application programming interface, a background offline data processing, a cache unit, and a database.

2. A Universal identification system for combining a plurality of identifications the system comprising:
    a Universal ID device including encrypted identification data storage and authentication access,
    a Universal ID reader having internet connection and able read the Universal ID device and an output to display data and
    a Universal ID computing system connected to the Universal ID reader and including at least one relational database ensuring uncorrupted data and at least one non-relational database for storage of information and wherein the Universal ID device is a smart card including a smart chip and wherein the Universal ID reader reads the information from the smart chip and using the internet requests information from a Universal ID services and wherein the Universal ID computing system further including microservices wherein each set of information represents a logical block of data and wherein the microservices include elements selected from the group consisting of an application programming interface, a background offline data processing, a cache unit, and a database.

3. The Universal identification system in claim 2 wherein the smart chip stores information about one or more of the following: a natural person, a juridical person, an animal, a plant and a thing.

4. The Universal identification system in claim 3 wherein the Universal ID reader further comprises an additional verification input unique to at least one of following associated with the Universal ID device: the natural person, the juridical person, the animal, the plant and the thing.

5. The Universal identification system in claim 4 wherein the Universal ID computing system includes computing services residing in a cloud.

6. A Universal identification system for combining a plurality of identifications the system comprising:
    a Universal ID device including encrypted identification data storage and authentication access,
    a Universal ID reader having internet connection and able read the Universal ID device and an output to display data and
    a Universal ID computing system connected to the Universal ID reader and including at least one relational database ensuring uncorrupted data and at least one non-relational database for storage of information and wherein the Universal ID device is a smart card including a smart chip and wherein the Universal ID reader reads the information from the smart chip and using the internet requests information from a Universal ID services and wherein the Universal ID computing system further including at least one microservice wherein the microservice each set of information processed represents a logical block of data and wherein the microservices include elements selected from the group consisting of an application programming interface, a background offline data processing, a cache unit, and a database.

7. The Universal identification system in claim 6 wherein the smart chip stores information about one or more of the following: a natural person, a juridical person, an animal, a plant and a thing.

8. The Universal identification system in claim 7 wherein the Universal ID reader further comprises an additional verification input unique to at least one of following associated with the Universal ID device: the natural person, the juridical person, the animal, the plant and the thing.

9. The Universal identification system in claim 8 wherein the Universal ID computing system includes computing services residing in a cloud.

* * * * *